United States Patent
Modarres Razavi et al.

(10) Patent No.: US 10,551,480 B2
(45) Date of Patent: Feb. 4, 2020

(54) NETWORK NODE, WIRELESS DEVICE AND METHODS PERFORMED THEREIN FOR ENABLING POSITIONING OF THE WIRELESS DEVICE

(71) Applicant: Telefonaktiebolaget LM Ericsson (publ), Stockholm (SE)

(72) Inventors: Sara Modarres Razavi, Linköping (SE); Fredrik Gunnarsson, Linköping (SE); Henrik Rydén, Solna (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/774,336

(22) PCT Filed: Nov. 9, 2016

(86) PCT No.: PCT/SE2016/051102
§ 371 (c)(1),
(2) Date: May 8, 2018

(87) PCT Pub. No.: WO2017/082805
PCT Pub. Date: May 18, 2017

(65) Prior Publication Data
US 2019/0049550 A1 Feb. 14, 2019

Related U.S. Application Data

(60) Provisional application No. 62/252,841, filed on Nov. 9, 2015.

(51) Int. Cl.
*H04W 64/00* (2009.01)
*G01S 5/10* (2006.01)
(Continued)

(52) U.S. Cl.
CPC .............. *G01S 5/10* (2013.01); *G01S 5/0226* (2013.01); *G01S 5/0252* (2013.01);
(Continued)

(58) Field of Classification Search
CPC ........ G01S 5/10; G01S 5/0036; G01S 5/0226; G01S 5/0252; G01S 5/0284; G01S 11/06; H04W 24/10; H04W 64/00; H04W 64/003
See application file for complete search history.

(56) References Cited

U.S. PATENT DOCUMENTS

2012/0040685 A1     2/2012  Escolar-Piedras et al.
2014/0349677 A1*   11/2014  Xiao ..................... H04W 4/02
                                                          455/456.1

FOREIGN PATENT DOCUMENTS

EP       2797347 A1    10/2014
WO   2012021097 A2     2/2012
(Continued)

OTHER PUBLICATIONS

3rd Generation Partnership Project, "LTE; Evolved Universal Terrestrial Radio Access (E-UTRA); LTE Positioning Protocol (LPP)" Technical Specification, 3GPP TS 36.355 version 12.4.0, Release 12, Apr. 1, 2015, pp. 1-128, ETSI TS 136 355 V 12.4.0, ETSI, France.

(Continued)

*Primary Examiner* — Pakee Fang
(74) *Attorney, Agent, or Firm* — Sage Patent Group

(57) ABSTRACT

Embodiments herein relate to a method performed by a wireless device (20) for enabling positioning of the wireless device in a wireless network. The wireless device executes a position process by evaluating one or more variables associated with the execution of the position process based on at least one discrimination threshold, and provides one or (Continued)

more feedback measurements to be used for calculating a position of the wireless device responsive to the evaluation.

12 Claims, 12 Drawing Sheets

(51) Int. Cl.
  *G01S 5/02* (2010.01)
  *H04W 24/10* (2009.01)
  *G01S 11/06* (2006.01)
(52) U.S. Cl.
  CPC ........... *G01S 5/0284* (2013.01); *H04W 24/10* (2013.01); *H04W 64/003* (2013.01); *G01S 11/06* (2013.01)

(56) References Cited

FOREIGN PATENT DOCUMENTS

| | | |
|---|---|---|
| WO | 2013067514 A1 | 5/2013 |
| WO | 2015023224 A2 | 2/2015 |

OTHER PUBLICATIONS

Ericsson, "On RSTD measurement report granularity", 3GPP TSG RAN WG4 Meeting #77, Anaheim, CA, USA, Nov. 16, 2015, pp. 1-3, R4-158054.

\* cited by examiner

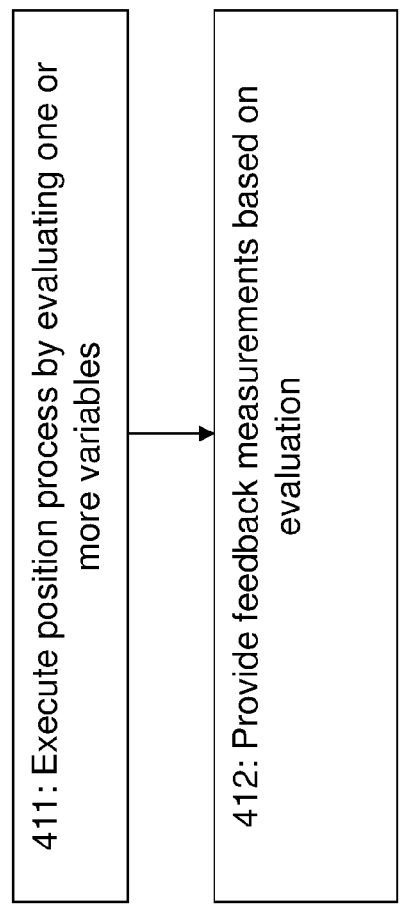

NETWORK NODE, WIRELESS DEVICE AND METHODS PERFORMED THEREIN FOR ENABLING POSITIONING OF THE WIRELESS DEVICE

TECHNICAL FIELD

Embodiments herein generally relate to wireless networks, and in particular to a first network node, wireless device and methods performed therein for enabling positioning of the wireless device.

BACKGROUND

Location-based services and emergency call positioning drive the development of positioning in wireless networks. Positioning support in $3^{rd}$ Generation Partnership Project Long Term Evolution (3GPP LTE) was introduced in Release 9. The introduced positioning support enables operators to retrieve position information for location-based services and to meet regulatory emergency call positioning requirements.

Positioning in LTE is supported by, e.g., the architecture in FIG. 1, where direct interactions between a wireless device (e.g., a UE) and a location server, e.g., an Evolved-Serving Mobile Location Center (E-SMLC), are via the LTE Positioning Protocol (LPP). Moreover, there are also interactions between the location server and the eNodeB via the LPPa protocol, which to some extent are supported by interactions between the eNodeB and the device via the Radio Resource Control (RRC) protocol.

The following exemplary positioning techniques are considered in LTE:

Enhanced Cell ID: Essential cell ID information to associate the wireless device to the serving area of a serving cell, and then additional information to determine a finer granularity position.

Assisted Global Navigation Satellite System (GNSS): GNSS information retrieved by the wireless device, supported by assistance information provided to the wireless device from E-SMLC.

Observed Time Difference of Arrival (OTDOA). Wireless device estimation of the time difference of reference signals from different networks node such as base stations and sending of such estimations to the E-SMLC for multi-lateration.

Uplink Time Difference Of Arrival (UTDOA), wherein a wireless device is requested to transmit a specific waveform for detection by multiple location measurement units, e.g., a base station, at known positions, and forwarding of these measurements to E-SMLC for multi-lateration.

Global positioning system (GPS)-enabled terminals can meet the requirement for positioning, but they cannot provide the required availability when the wireless is being blocked to the satellite signals in urban and indoor environments. Therefore other techniques are needed in such environments. OTDOA has been introduced in 3GPP release 9 as a downlink (DL) positioning method. As illustrated in FIG. 2, OTDOA in LTE is based on the wireless device measuring the time of arrival (TOA) of signals received from network nodes such as eNBs. The wireless device measures the relative difference of TOA between a reference cell and another specific cell, defined as reference signal time difference (RSTD) measurement. Every such RSTD measurement determines a hyperbola, and the intersecting point of these hyperbolas can be considered as the position of the wireless device. Here, the wireless device selects the reference cell, where the RSTD measurement can be performed on an intra-frequency cell, wherein reference cell/neighbor cell are on the same carrier frequency as the serving cell, or inter-frequency cell, wherein at least one of reference cell/neighbor cell is on a different carrier frequency from that of the serving cell.

The OTDOA-based positioning accuracy depends directly on the accuracy of the RSTD measurements. While having device RSTD measurements with respect to more cells is generally viewed more beneficial because the amount of the information about the wireless device location increases, the accuracy of the result still relies on the precision of the RSTD estimations for all the RSTD measurements. The RSTD accuracy is largely dependent on the type of cells that the wireless device measures. Because the type of cell is not known at the wireless device, results for e.g. mixed-cell scenarios may experience performance degradation, e.g., when small and large cells are present in the area or the wireless device can be in indoor and outdoor environments, leading to a poor accuracy when determining a location of the wireless device.

SUMMARY

An object of embodiments herein is to improve the positioning accuracy in a wireless communication network.

According to an aspect the object is achieved by providing a method performed by a wireless device for enabling positioning of the wireless device in a wireless network. The wireless device executes a position process by evaluating one or more variables associated with the execution of the position process based on at least one discrimination threshold. The wireless device further provides one or more feedback measurements to be used for estimating a position of the wireless device responsive to the evaluation.

According to another aspect the object is achieved by providing a method performed by a first network node for enabling positioning of a wireless device in a wireless network. The first network node receives a measurement report from the wireless device, which measurement report comprises one or more feedback measurements associated with at least one discrimination threshold. The first network node further estimates a position of the wireless device based on the received measurement report and on that the one or more feedback measurements are associated with the at least one discrimination threshold.

According to yet another aspect the object is achieved by providing a wireless device for enabling positioning of the wireless device in a wireless network. The wireless device is configured to execute a position process by evaluating one or more variables associated with the execution of the position process based on at least one discrimination threshold. Furthermore, the first wireless device is configured to provide one or more feedback measurements to be used for estimating a position of the wireless device responsive to the evaluation.

According to still another aspect the object is achieved by providing a first network node for enabling positioning of a wireless device in a wireless network. The first network node is configured to receive a measurement report from the wireless device, which measurement report comprises one or more feedback measurements associated with at least one discrimination threshold. The first network node is further configured to estimate a position of the wireless device based on the received measurement report and on that the one or more feedback measurements are associated with the at least one discrimination threshold.

The embodiments presented herein improve the positioning accuracy by enabling the wireless device and/or the first network node to discriminate regarding which feedback measurements are used as part of e.g. a time-based positioning process.

BRIEF DESCRIPTION OF THE DRAWINGS

FIG. 4b shows one exemplary method of the solution presented herein as implemented by the wireless device.

DETAILED DESCRIPTION

Figure 1:
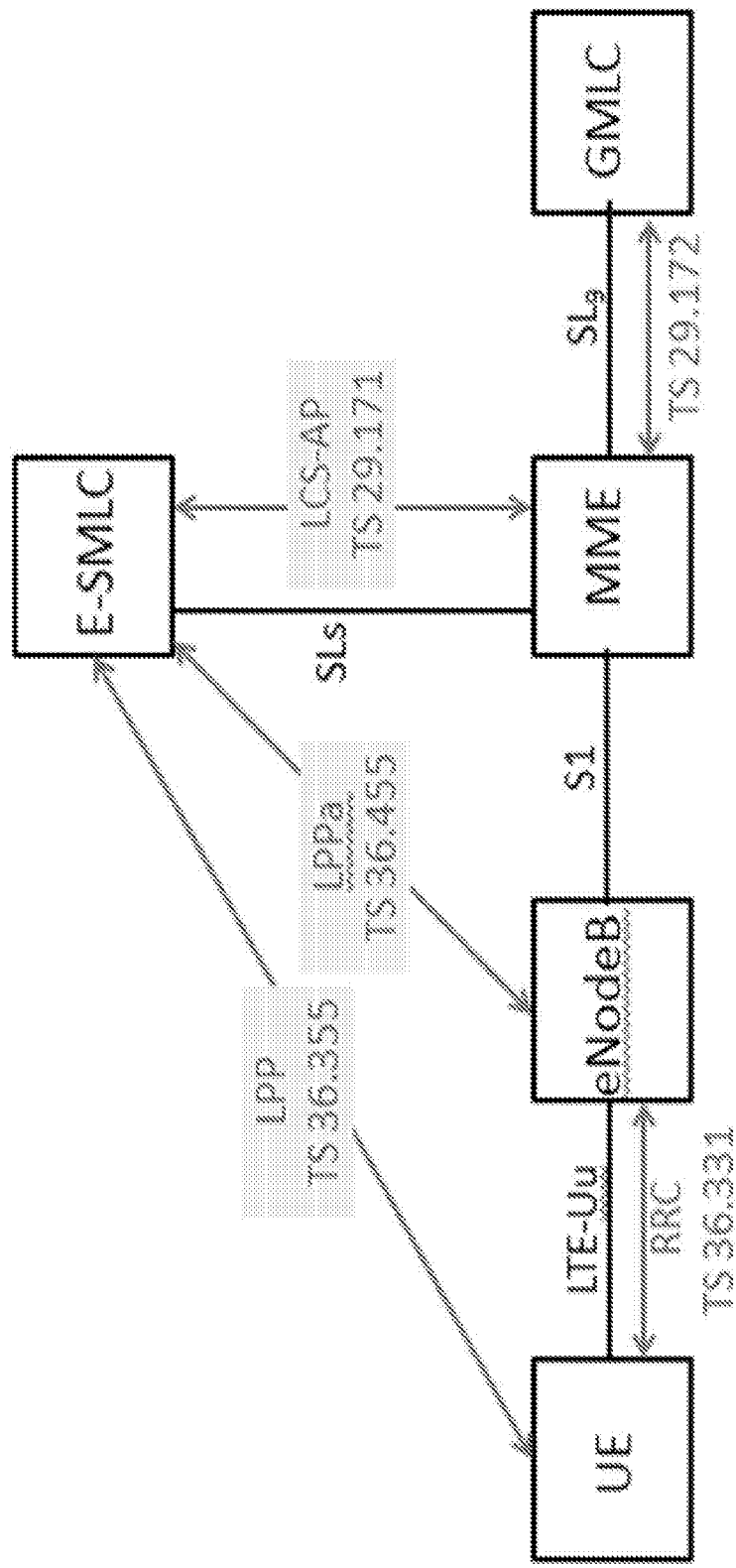
FIG. 1 shows one exemplary LTE positioning architecture.
Figure 2:
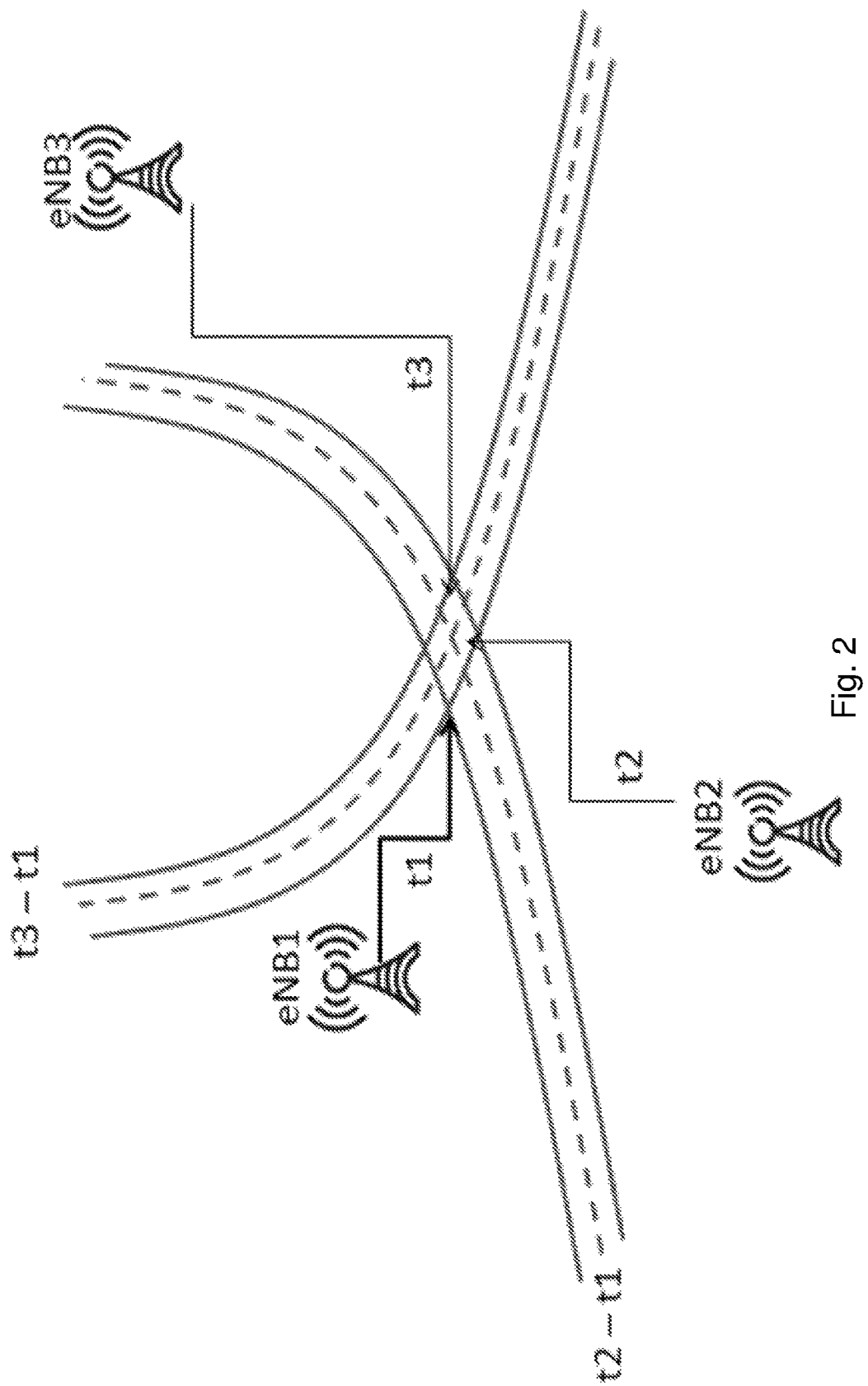
FIG. 2 shows an example of OTDOA in LTE.
Figure 3:
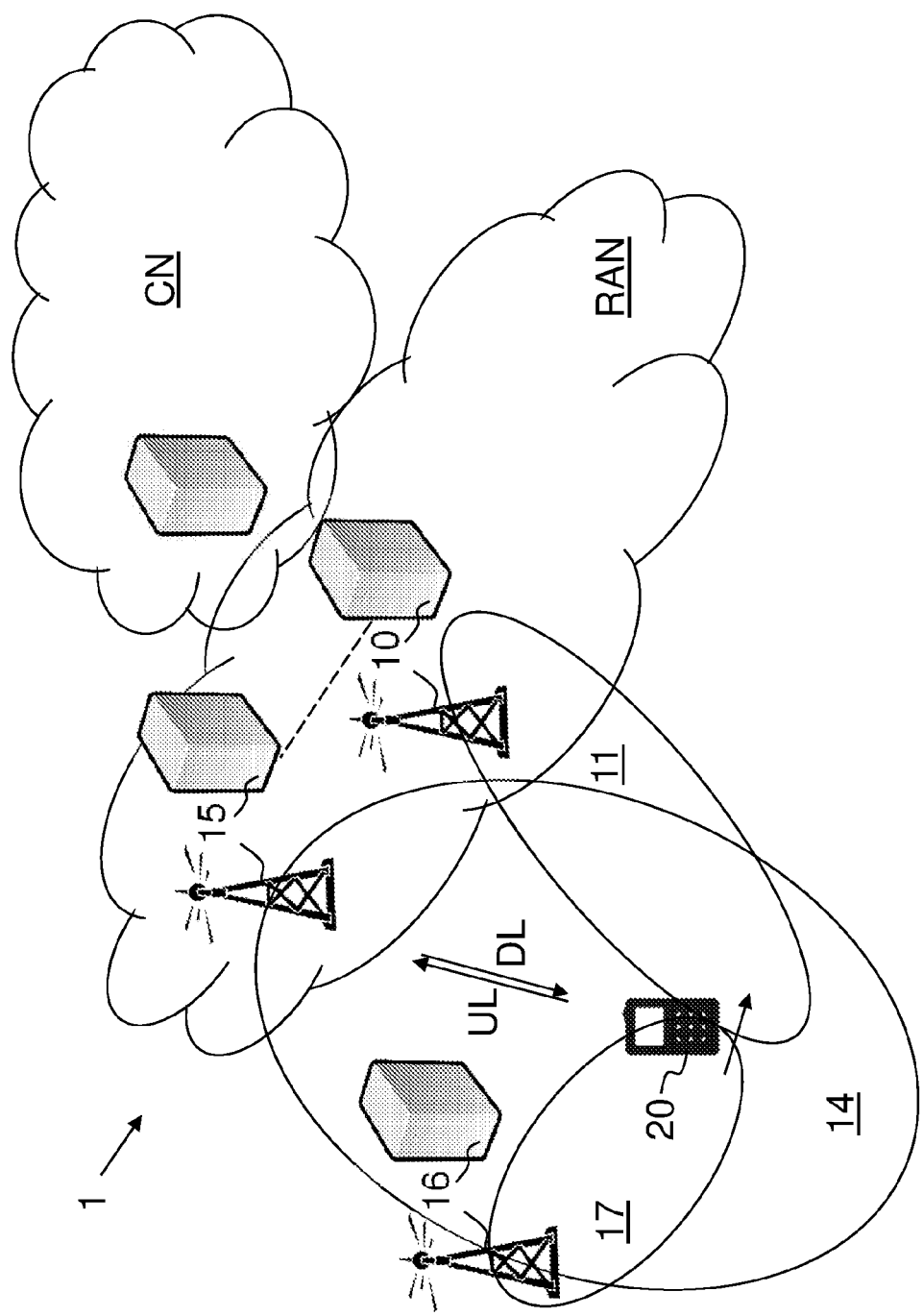
FIG. 3 is a schematic overview depicting a wireless network according to embodiments herein.

Embodiments herein relate to wireless networks in general. FIG. 3 is a schematic overview depicting a wireless network 1. The wireless network 1 comprises one or more Radio Access Networks (RANs) and one or more Core Networks (CNs). The wireless network 1 may use one or a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless systems such as e.g. WCDMA and LTE.

In the wireless network 1, wireless devices e.g. a wireless device 20 such as a mobile device, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless network 1 comprises a first network node 10 providing radio coverage over a geographical area, a first service area 11, of a first radio access technology (RAT), such as NR, LTE, Wi-Fi, WiMAX or similar. The first network node 10 may be a transmission and reception point e.g. a positioning node or a radio network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the first network node 10 depending e.g. on the first radio access technology and terminology used. The first network node 10 may be referred to as an access point and communicates with the wireless device 20 with downlink (DL) transmissions to the wireless device 20 and uplink (UL) transmissions from the wireless device 20. The first network node 10 may thus be the positioning node, an indoor access point or similar.

Furthermore, the wireless network 1 comprises a second network node 15 providing radio coverage over a geographical area, a second service area 14, of a second RAT, such as NR, LTE, Wi-Fi, WiMAX or similar. The second network node 15 may be a transmission and reception point e.g. a radio network node such as a WLAN access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the second network node 15 depending e.g. on the second radio access technology and terminology used. The first and second RATs may be the same or different RATs. The second network node 15 may be referred to as a radio network node providing a macro cell or similar.

Furthermore, the wireless network 1 comprises a third network node 16 providing radio coverage over a geographical area, a third service area 17, of a third RAT, such as NR, LTE, Wi-Fi, WiMAX or similar. The third network node 16 may be a transmission and reception point e.g. a radio network node such as a WLAN access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the third network node 16 depending e.g. on the third radio access technology and terminology used. The first, second, and third RATs may be the same or different RATs. The third network node 16 may be referred to as a neighbour network node.

The radio network nodes such as the first network node 10 and the second network node 15, may communicate in the wireless network 1. This is done by communicating with one another over a backhaul connection, e.g. an X2 connection, an S1 connection or similar, between e.g. the first network node 10 and the second network node 15.

The wireless device 20 executes, according to embodiments herein, a position process, i.e. performs actions during a process for positioning the wireless device 20, by evaluating one or more variables associated with the execution of the position process. Such variables may for example be positioning measurements or time difference measurements, using at least one discrimination threshold, e.g. a time difference threshold.

The wireless device 20 then provides, internally to a processor or externally to the first network node 10, one or more feedback measurements, such as positioning measurements or time difference measurements, to be used for calculating the position of the wireless device 20 responsive to the evaluation. E.g. the evaluation may exclude or discriminate some feedback measurements falling outside e.g. the time difference threshold, and the wireless device 10 may provide only selected, not excluded or discriminated, feedback measurements to the first network node for calculation of the position of the wireless device 20.

By discriminating some feedback measurements, it is possible to improve the positioning accuracy in e.g. mixed cell deployments. By introducing time difference threshold and reference threshold as in some embodiments, it should be possible to filter out e.g. RSTD measurements with unfavorable mixture of macro and small cells. By discriminating measurements at the wireless device 20, as disclosed in some embodiments herein, the reporting becomes more efficient by only reporting, at a fine granularity, a subset of the feedback measurements. By discriminating feedback measurements for example while the wireless device 20 is indoor; and the wireless device 20 is far away from a network node of a closest macro cell, it is more beneficial in terms of positioning estimation to sort out the RSTD measurements of the macro-cell, i.e. to exclude or put less weight to these RSTD measurements.

Figure 4A:
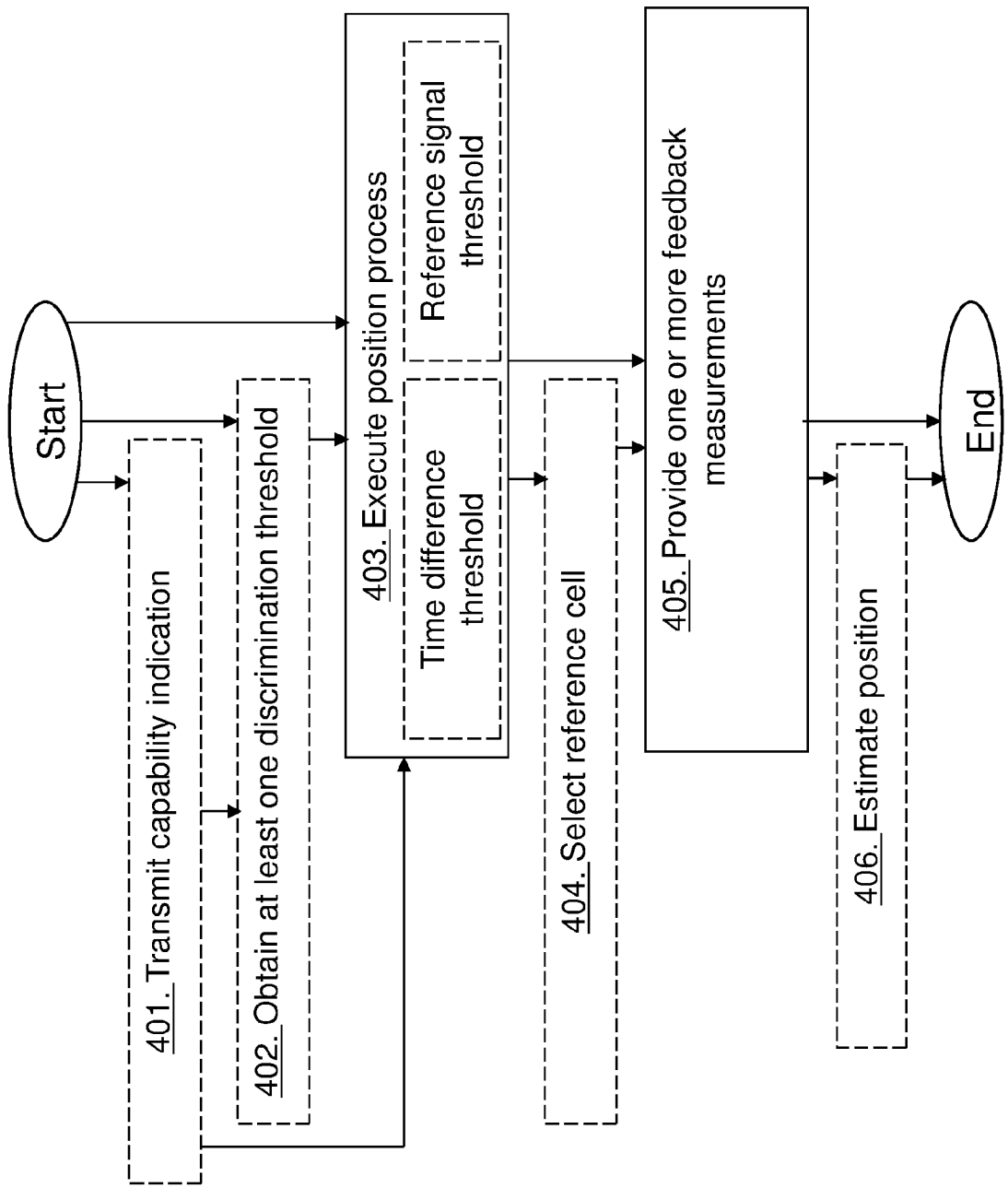
FIG. 4a shows a flowchart depicting a method performed by a wireless device according to embodiments herein.

The method actions performed by the wireless device 20 for enabling positioning of the wireless device 20 in the wireless network 1 according to some embodiments will now be described with reference to a flowchart depicted in FIG. 4a. The actions do not have to be taken in the order stated below, but may be taken in any suitable order. Actions performed in some embodiments are marked with dashed boxes.

Action 401. The wireless device 20 may transmit a capability indication indicating capability for using the at least one discrimination threshold.

Action 402. The wireless device 20 may obtain the at least one discrimination threshold from the first network node 10.

Action 403. The wireless device 20 executes a position process by evaluating one or more variables associated with the execution of the position process based on the at least one discrimination threshold. The one or more variables may comprise one or more measurements for positioning the wireless device 20 and the at least one discrimination threshold may be for discriminating among the one or more measurements for positioning the wireless device 20. The one or more variables may comprise time differences between times of arrival of signals at the wireless device 20, e.g. one or more reference signal time difference measurements. The at least one discrimination threshold may comprise the time difference threshold for determining or indicating which ones of the one or more feedback measurements to include in a measurement report when providing the one or more feedback measurements to the first network node 10, and/or which ones of the one or more feedback measurements to use when estimating or calculating the position of the wireless device 20. E.g. the wireless device 20 may compare time differences between TOAs of reference signals and discriminate e.g. exclude or give less weight to, time differences above the time difference threshold. Hence, the wireless device 20 may select time differences below the time threshold to be used for estimating or calculating the position of the wireless device. The wireless device may evaluate the one or more variables by: discriminating feedback measurements based on the time difference threshold; performing feedback measurements when, or in some embodiments only when, the feedback measurements are expected to satisfy a discrimination threshold condition based on the time difference threshold; estimating or calculating a position of the wireless device using, or in some embodiments using only, those feedback measurements that satisfy the discrimination threshold condition based on the time difference threshold; and/or by generating a measurement report containing, or in some embodiments containing only, those feedback measurements that satisfy the discrimination threshold condition based on the time difference threshold. The at least one discrimination threshold may additionally or alternatively comprise a reference signal threshold used for selecting a reference cell for evaluating the one or more variables.

Action 404. In some embodiments the one or more variables comprises at least one feedback measurement and the wireless device 20 selects, using the reference signal threshold, the reference cell as a reference point for performing the at least one feedback measurement. Strictly speaking, the reference point may mean a reference network node, providing the reference cell, when measuring time difference between TOAs. That is, the wireless device 20 uses the reference signal threshold to select the reference point being closer to the wireless device 20 to exclude a reference cell being too far away that would give a less accurate positioning result. The wireless device 20 may for example select the reference cell as a cell, e.g. service area 11, provided by the first radio network node 10 when the TOA of reference signals, which TOA is associated with or are from the first radio network node 10, are below the reference signal threshold.

Action 405. The wireless device 20 then provides one or more feedback measurements, e.g. time differences, to be used for estimating, e.g. calculating, the position of the wireless device 20 responsive to the evaluation. The one or more feedback measurements may comprise one or more selected time differences between times of arrival of signals at the wireless device 20 and/or one or more selected measurements for positioning the wireless device 20. For example, the wireless device 20 may calculate time differences between TOAs of reference signals from the different network nodes as feedback measurements and provide the ones that are below the time difference threshold or indicate which ones that are below the time difference threshold. The one or more feedback measurements may comprise one or more selected reference signal time difference measurements. That is, the wireless device 20 may provide the selected, non-discriminated, time differences, or indicate which ones of the feedback measurements are below the time difference threshold, to a process for estimating or calculating the position of the wireless device. The wireless device 20 may thus provide the one or more feedback measurements by providing the measurement report comprising one or more indications indicating which ones of the one or more feedback measurements that are selected, i.e. non-discriminated, based on the at least one discrimination threshold. The process for estimating or calculating the position of the wireless device 20 may be performed by the wireless device 20 or by e.g. the first network node 10.

Action 406. The wireless device 20 may estimate, or calculate, the position of the wireless device 20 based on the one or more feedback measurements and further, in the estimation, take into account whether the one or more feedback measurements are discriminated or non-discriminated. This may for example mean excluding or giving less weight to feedback measurements that are discriminated, e.g. by not being indicated as selected.

FIG. 4b shows one exemplary method from the perspective of the wireless device 20 comprising executing the position process by evaluating the one or more variables associated with the execution of the position process using the at least one discrimination threshold, action 411, and providing one or more feedback measurements used to calculate the position of the wireless device 20 responsive to the evaluation, action 412. For example, the wireless device 20 may select one or more RSTD measurements using an RSTD discrimination threshold, and use the selected RSTD measurements to calculate the position of the wireless device 20. In exemplary embodiments, the execution of the position process comprises:

performing feedback measurements only when the expected feedback measurement satisfies a discrimination threshold condition e.g. by being below the at least one discrimination threshold; and/or using the at least one discrimination threshold to select a reference cell used as a reference point for performing the feedback measurements; and/or measuring a position of the wireless device 20 using only those feedback measurements that satisfy a discrimination threshold condition e.g. by being below the at least one discrimination threshold; and/or generating a measurement report containing only those measurements that satisfy a discrimination threshold condition e.g. by being below the at least one discrimination threshold; and/or sending the measurement report and/or any of the measurements generated using the at least one discrimination threshold(s) to the first network node 10.

Figure 5A:
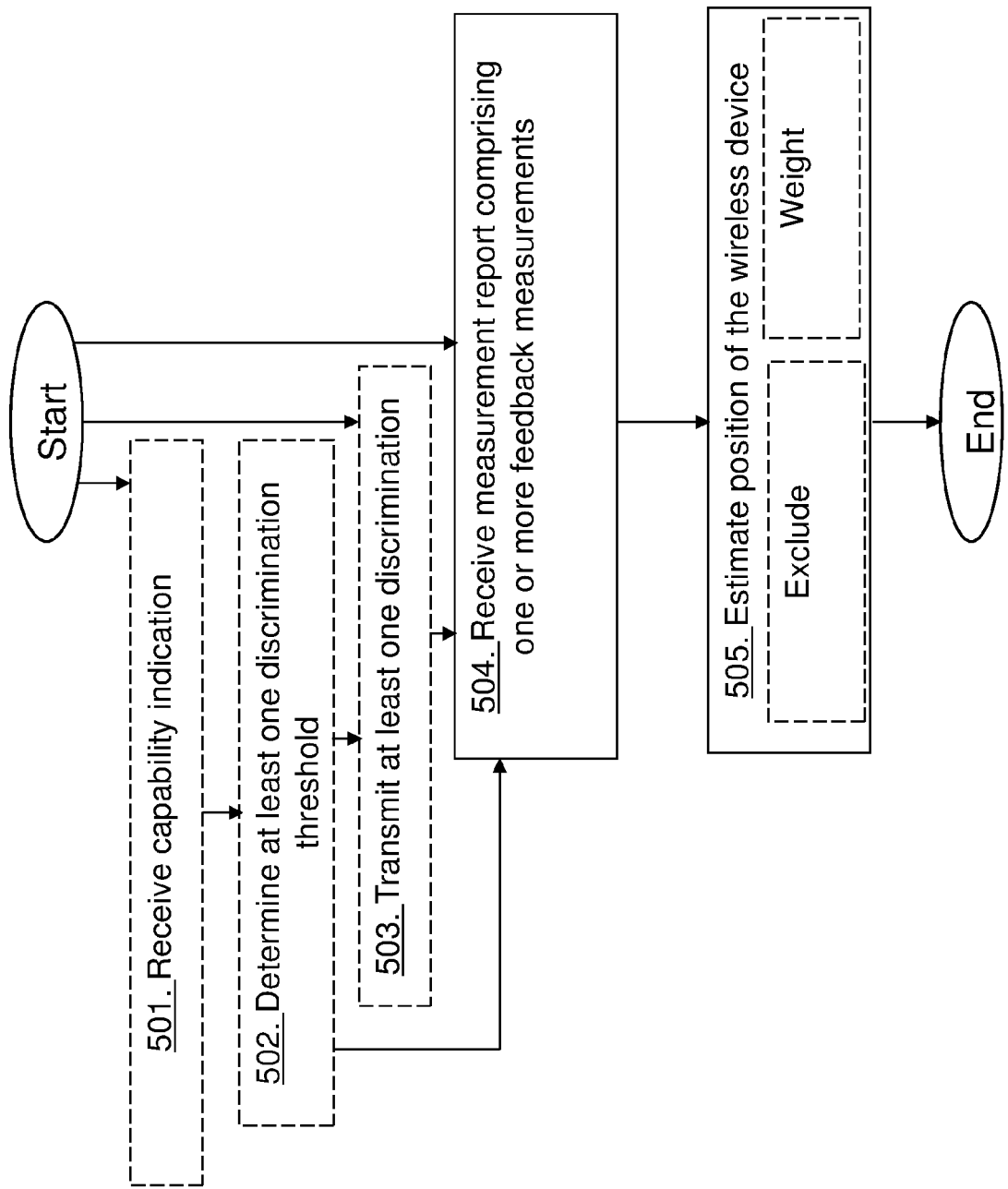
FIG. 5a shows a flowchart depicting a method performed by a first network node according to embodiments herein.

The method actions performed by the first network node 10, e.g. a positioning node or a radio network node, for enabling positioning of the wireless device 20 in the wireless network 1 according to some embodiments will now be described with reference to a flowchart depicted in FIG. 5a. The actions do not have to be taken in the order stated below, but may be taken in any suitable order. Actions performed in some embodiments are marked with dashed boxes.

Action 501. The first network node 10 may receive from the wireless device 20, the capability indication indicating capability for using the at least one discrimination threshold.

Action 502. The first network node 10 may determine the at least one discrimination threshold based on the received capability indication. The at least one discrimination threshold may be obtained autonomously, or from another network node.

Action 503. The first network node 10 may transmit the at least one discrimination threshold to the wireless device 20, which at least one discrimination threshold may comprise the time difference threshold for determining which ones of the one or more feedback measurements to include in the measurement report, and/or for determining which ones of the one or more feedback measurements to use when calculating the position of the wireless device 20. Additionally or alternatively, the at least one discrimination threshold may comprise the reference signal threshold to be used for selecting a reference cell for evaluating one or more variables at the wireless device 20.

Action 504. The first network node 10 receives the measurement report from the wireless device 20, which measurement report comprises the one or more feedback measurements associated with the at least one discrimination threshold. The feedback measurements may be associated with the at least one discriminating thresholds by it being indicated in the measurement report that the wireless device uses the at least one discriminating threshold on one or more feedback measurements; by it being indicated in the measurement report which ones of the one or more feedback measurements are subject to discrimination; and/or the first network node 10 may apply the at least one discriminating threshold on the one or more feedback measurements when estimating or calculating the position of the wireless device 20. The received measurement report may comprise one or more indications indicating which ones of the one or more feedback measurements that are selected based on the at least one discrimination threshold.

Action 505. The first network node 10 estimates, or calculates, the position of the wireless device 20 based on the received measurement report and on that the one or more feedback measurements are associated with the at least one discrimination threshold. The first network node 10 may e.g. exclude at least one feedback measurement in the received measurement report based on the at least one discrimination threshold. Additionally or alternatively, the first network node 10 may weight at least one feedback measurement relative another feedback measurement based on the at least one discrimination threshold. Hence, the first network node 10 may exclude or give less weight to feedback measurements that are above the at least one discrimination threshold. The first network node 10 may estimate, or calculate, the position of the wireless device 20 based on said one or more indications received from the wireless device 20.

Figure 5B:
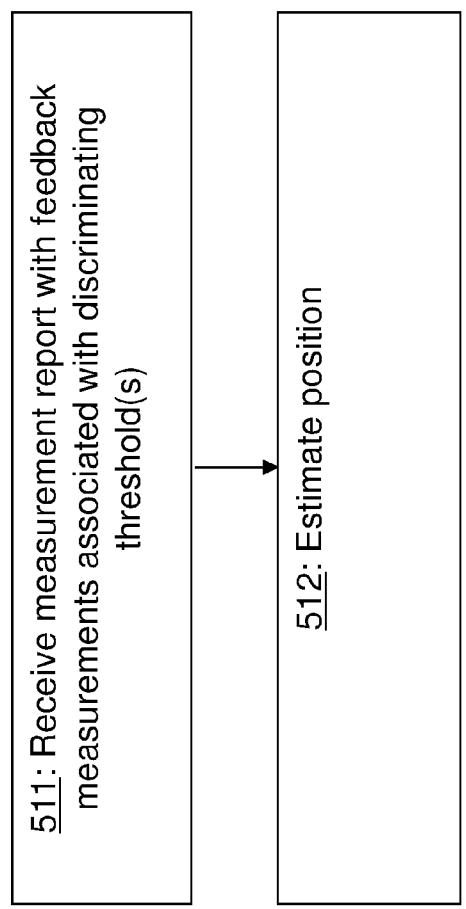
FIG. 5b shows one exemplary method of the solution presented herein as implemented by the first network node.

FIG. 5b shows one exemplary method as implemented by a network node comprising receiving a measurement report from the wireless device 20, see action 511, the measurement report including one or more feedback measurements derived by the wireless device 20 using at least one discrimination threshold, and processing the received measurement(s) to determine a position of the wireless device 20, action 512.

The following discusses various details regarding the implementation of the embodiments presented herein. In these examples, the discrimination thresholds may include an RSTD threshold (RSTD_threshold) also referred to as the time difference threshold and the reference signal threshold (ref_threshold). It will be appreciated that the following examples are for illustrative purposes, and thus are not limiting.

Figure 6:
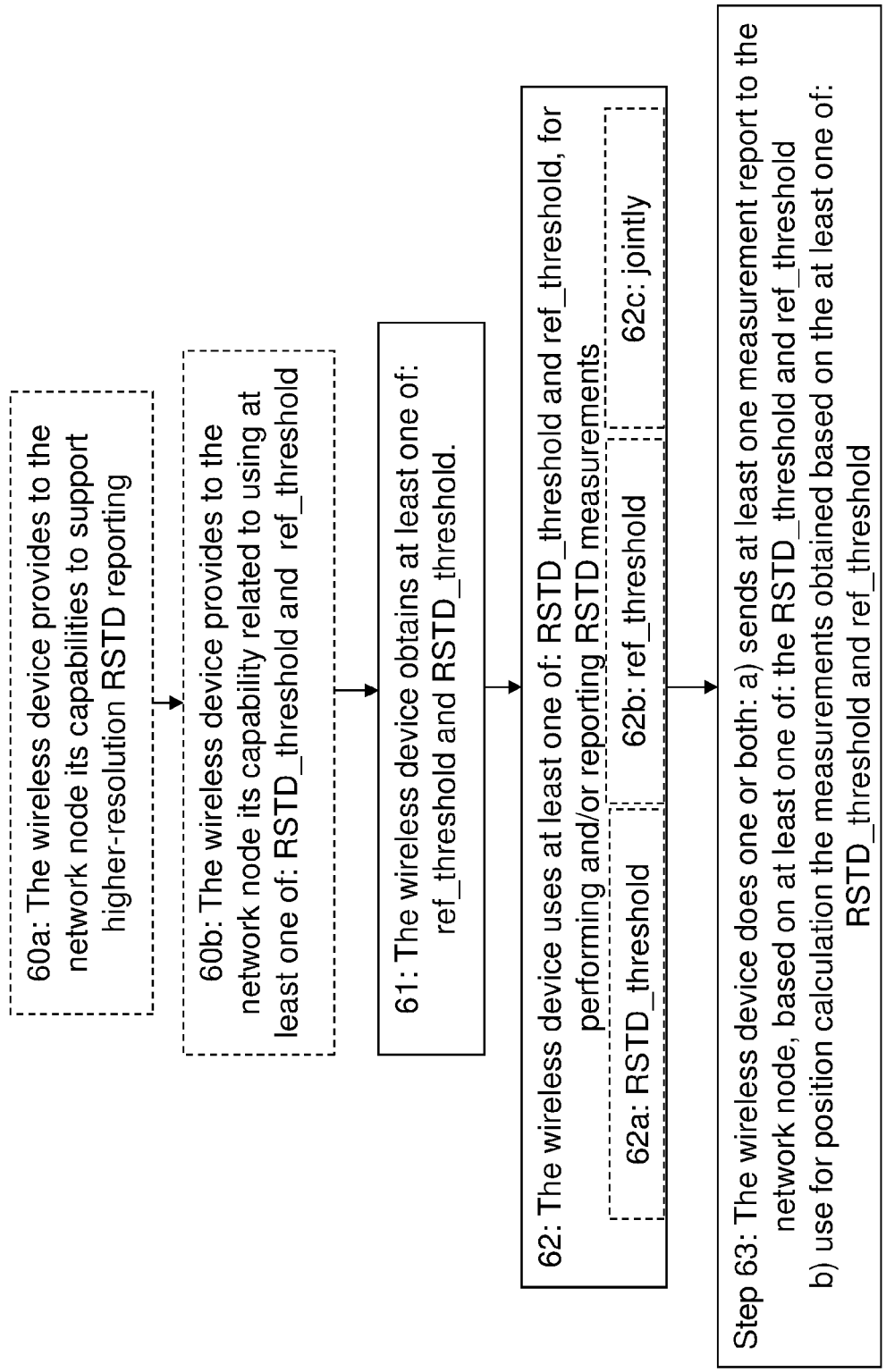
FIG. 6 shows one example of the solution presented herein from the perspective of the wireless device.

FIG. 6 shows one exemplary implementation of embodiments presented herein, where the wireless device 20 optionally provides (FIG. 6, actions 60a and 60b) to the first network node 10 its capabilities on the finest reporting resolution it can support. In case multiple report resolutions are supported, one supported less detailed report resolution can be considered as the base report resolution in which only wireless devices that can support the base report resolution or a finer report resolution can receive thresholds from the network. Further, the wireless device 20 optionally obtains (FIG. 6, action 61) at least one of: the RSTD_threshold and the ref_threshold. The RSTD_threshold is, e.g., the maximum allowed RSTD reported value, and the ref_threshold may be, e.g., a TOA_threshold as the maximum allowed TOA for the selected reference cell by the wireless device 20. With these two thresholds, it should be possible to filter out RSTDs with unfavorable mixture of macro cells and small cells. An example of a ref_threshold is also a number of measurements (N) to ensure that at least N measurements are reported or considered in the positioning calculation or estimation.

The wireless device 20 may obtain the discrimination threshold(s) by reading a pre-defined value from memory, selecting the discrimination threshold(s) from a set of pre-defined or pre-configured values from memory, receiving the discrimination threshold(s) from another node, determining the discrimination threshold(s), e.g., based on measurements.

With reference to FIG. 6, action 62 comprises using the threshold(s) to perform and/or report RSTD measurement. One exemplary action 62 (action 62*a*) may include using the RSTD_threshold, e.g., to limit a number of reportable RSTD measurements. For example, only RSTD measurements are reported or RSTD measurements are prioritized when abs(RSTD_measurement)<RSTD_threshold. In another example, the wireless device 20 may not perform the RSTD measurement if it expects the RSTD measurement to not meet a condition based on the RSTD_threshold, e.g., if the wireless device 20 expects the RSTD_measurement to not meet abs(RSTD_measurement)<RSTD_threshold.

Another exemplary action 62 (action 62*b*) comprises using the reference signal threshold (ref_threshold). The ref_threshold may be used to adaptively select the reference cell for RSTD measurements. In one example, the ref_threshold may comprise a TOA_threshold that is applied so that a cell may be a reference cell for RSTD measurements if the TOA for that cell is below TOA_threshold.

Yet another exemplary action 62 (action 62*c*) comprises jointly using the RSTD_threshold and ref_threshold. In one example, the wireless device 20 can select a reference cell as in exemplary action 62*b*, and then select RSTD measurements to report as described in exemplary action 62*a*. In another example, when multiple cells can meet the ref_threshold, e.g. TOA_threshold, the wireless device 20 uses the ref_threshold and the RSTD_threshold to ensure that, e.g., a certain number (e.g., N) of RSTD measurements are obtained or to maximize the number of RSTD measurements that meet both conditions associated with the two thresholds.

In one embodiment, the wireless device 20 sends the measurement report and optionally includes information if the threshold constraints have been fulfilled for the measurement reports, action 63*a*. The wireless device 10 may use for position estimation or calculation the measurements obtained based on the at least one of: RSTD_threshold and ref_threshold, action 63*b*.

In one embodiment, where the positioning calculation is in the network node, e.g., the positioning node, the method of discriminating the RSTD measurements can be included in the position calculation. In another embodiment, the network could control the desired measurements, e.g., signal the RSTD_threshold to the wireless device so that RSTD measurements with abs(RSTD_measurement)>RSTD_threshold are not reported to the network node, i.e. the first network node 10. The wireless device 20 can also select the reference cell and report a different reference cell, e.g. third network node 16, than configured by the network, so the wireless devices supporting higher resolution RSTD, may select the reference cell with the smallest distance to it, e.g., based on TOA or Round Trip Time (RTT), so in the same embodiment the network signals the ref_threshold, which the wireless device 20 uses to choose the reference cell based on the condition that TOA(cell)<ref_threshold. With these two thresholds, it should be possible to filter out RSTD measurements with unfavorable mixture of macro and small cells. The discussion applies to general measurement reports e.g. in a mixed cell deployments, but will be exemplified for RSTD measurements.

In one embodiment this signaling may also be subject to the capability of the wireless device 20 e.g. signaled to E-SMLC, e.g., only wireless devices supporting higher resolution RSTD, can receive such thresholds from the network node. In another embodiment, the signaling of the two thresholds can be independent of each other, meaning that the first network node can only provide the wireless device with one of these thresholds or both, in two signaling messages or in a joint signaling message.

In one embodiment, the measurements, for which abs(RSTD_measurement)>RSTD_threshold, are not dropped. Instead, a coarse reporting resolution can be used for these measurements, that do not satisfy the threshold condition, while a finer granularity is used for measurements where abs(RSTD_measurement)<RSTD_threshold.

In one embodiment, the wireless device is configured with a threshold, a number threshold, indicating a number (N) of RSTD measurements, to ensure that at least N RSTD measurements are reported, are reported with fine granularity, or are considered in the position calculation independent of the discrimination criterion.

In one embodiment, the choice of applying the discrimination thresholds criteria can be mandatory for the wireless device 20, or it can be up to the wireless device 20 to use the indicated resolution or reject it, and choose its own preference. In one embodiment, where the first network node 10 such as a location server has sent the wireless device the suggested thresholds, the wireless device is required to respond and indicate if the conditions have been met or if the thresholds are considered in the measurement reports or not.

In one embodiment, the cell-types of the required cells to measure are signaled to the wireless device 20. This signaling is made in order to discriminate one type of cells (e.g. outdoor cells), even if the abs(RSTD_measurements)<RSTD_threshold criteria is fulfilled for an outdoor cell.

If the wireless device is operating in a mixed-cell scenario, the method may comprise obtaining at least one new parameter or criteria for discriminating among positioning measurements, e.g., receiving the at least one new parameter from another node, calculating or determining the at least one new parameter autonomously, using history information to determine the at least one new parameter, or reading a pre-defined or pre-configured value for the at least one new parameter. The at least one new parameter or criteria may be at least one of ref_threshold and RSTD_threshold.

Returning back to FIG. 6 (action 63), the wireless device considers the discriminated measurements to calculate the position of the wireless device using the set of measurements obtained based on using the thresholds and/or report the final set of measurements obtained based on using the thresholds.

Figure 7:
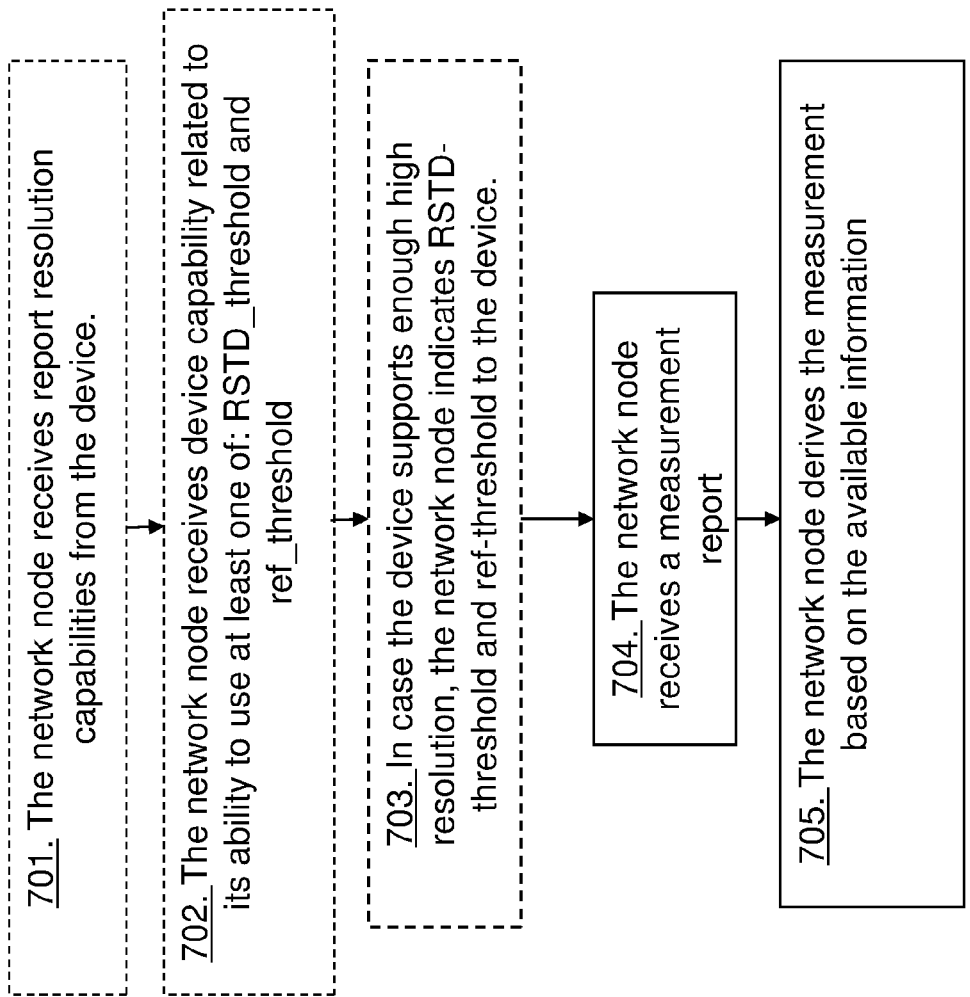
FIG. 7 shows one example of the solution presented herein from the perspective of the first network node.

FIG. 7 shows one exemplary implementation of embodiments presented herein, where the network node, e.g. the first network node 10, optionally receives the supported report resolutions from the wireless device 20, action 701. The network node may receive device capability related to its ability to use at least one of: RSTD_threshold and ref_threshold, action 702.

The first network node optionally indicates the RSTD_threshold and the ref_threshold in case the supported report resolution by the wireless device 20 was in an acceptable level, action 703. The first network node receives a measurement report from the wireless device, action 704. Then, the first network node derives the measurement from the measurement report in consideration of the selected reference cell, and if the RSTD measurements satisfy the threshold constraints, action 705.

The methods in the first network node for determining wireless device position in e.g. a mixed-cell scenario comprise determining at least one parameter or criteria, i.e. the at least one discrimination threshold, for discriminating among wireless device measurements, which may include:
  an indication that the wireless device is under small cell coverage, especially small cells deployed indoors, where measurement values have small ranges; and/or
  an indication that the wireless device is under macro cell coverage.

The at least one new parameter or criteria may be at least one of the ref_threshold and RSTD_threshold. The method may optionally comprise sending the assistance data comprising or based on at least one new parameter to a wireless device (e.g., selecting the reference cell to be a small cell or sending a new threshold). Further, the method comprises receiving measurements from the wireless device in the measurement report. The measurements may include:
  Cell-specific Reference Signal (CRS)/Positioning Reference signal (PRS) bandwidths of the serving cell on which measurement is done;
  Sounding Reference Signal (SRS) bandwidth of signals transmitted by the wireless device; and/or
  Measured Reference Signal Received Power (RSRP) and Reference Signal Received Quality (RSRQ) results.

The method further comprises using the measurements selected based on the parameter for wireless device position calculation, e.g., selected by the wireless device based on the optional step of sending the new parameter or selected by the network node using the new determined parameter.

Figure 8:
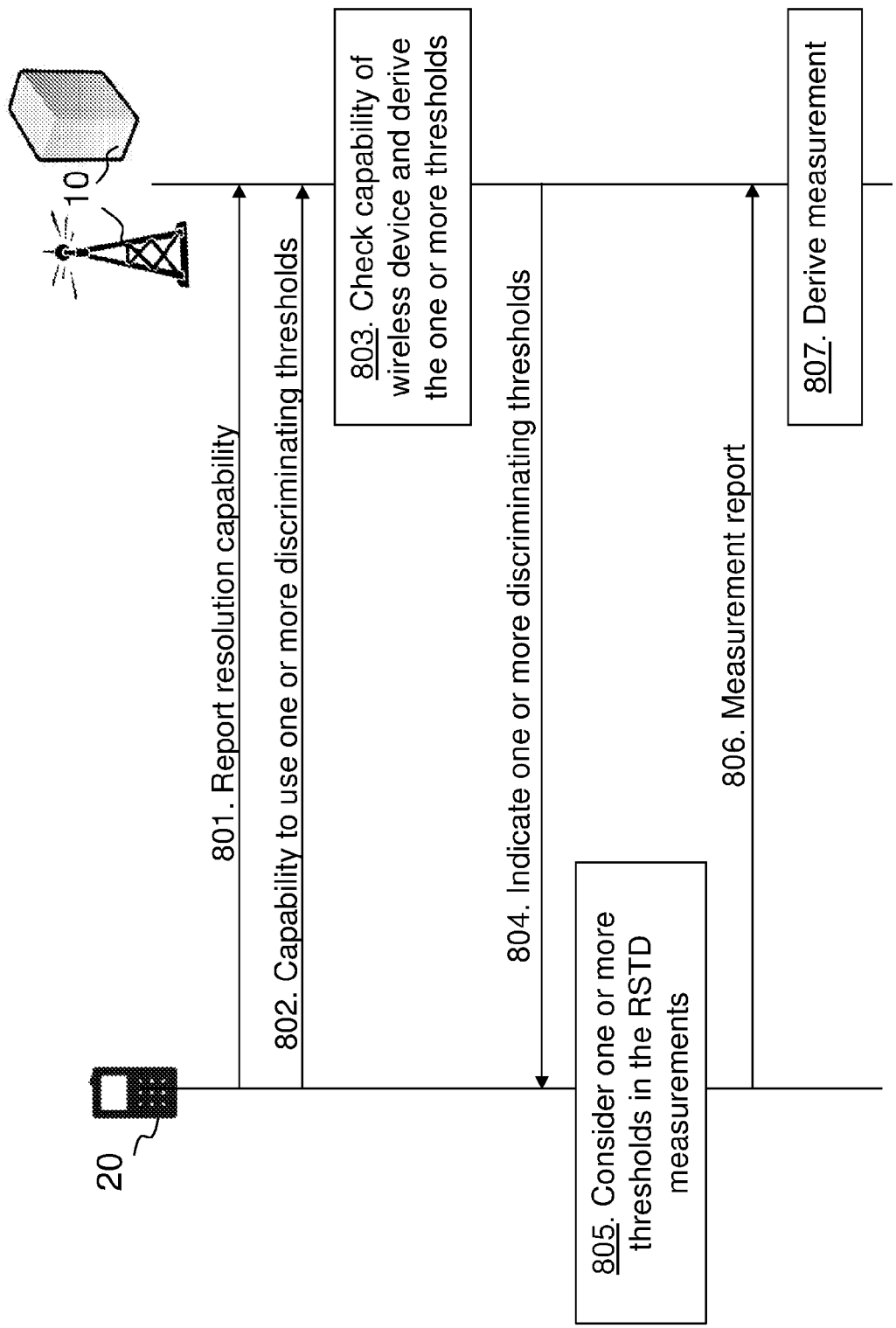
FIG. 8 shows an exemplary signaling chart of the solution presented herein.

FIG. 8 shows an exemplary signaling diagram with basic signaling steps. The wireless device 20 optionally provides the report resolution capabilities, and its capabilities in using the RSTD_threshold and/or ref_threshold, actions 801-802. The first network node 10 may then check capability of the wireless device 20 and derive the one or more thresholds, action 803. Then the first network node 10, in case the reporting resolution capability of the wireless device was adequate, optionally indicates an RSTD_threshold and/or a ref_threshold to the wireless device, action 804. The wireless device 20 optionally considers the sent thresholds on the measured RSTDs and applies the condition of RSTD_threshold, or ref_threshold to the measurement report sent to the network node, action 805. The first network node 10 can use the thresholds to discriminate, e.g., by:
  selecting among the received RSTD measurements those that meet the RSTD_threshold, and/or
  receiving TOA measurements and then create RSTD measurements using jointly ref_threshold and RSTD_threshold to obtain RSTD measurements for calculating the UE position.

The measurement may be a relative time difference measurement such as the RSTD or the device Rx-Tx time difference, or a received signal strength measurement. It may also be a time measurement in general. Essentially, the solution presented herein generalizes to any kind of feedback measurements.

The embodiments presented herein improve the positioning accuracy enabling the device and/or network node to discriminate regarding which feedback measurements are used as part of a time-based positioning process. One exemplary method as implemented by a wireless device, e.g., any type of wireless device capable of communicating with a network node or other device using radio signals, comprises executing a position process by evaluating one or more variables associated with the execution of the position process using at least one discrimination threshold, and providing one or more feedback measurements used to calculate a position of the wireless device responsive to the evaluation. To that end, one exemplary wireless device comprises radio circuitry, a memory, and a processing circuit. The processing circuit evaluates one or more variables associated with the execution of a position process using at least one discrimination threshold to provide the one or more feedback measurements used to calculate a position of the wireless device. In exemplary embodiments, the execution of the position process comprises:
  performing feedback measurements only when the expected feedback measurement satisfies a discrimination threshold condition; and/or
  using a discrimination threshold to select a reference cell used as a reference point for performing the feedback measurements; and/or
  measuring a position of the wireless device using only those feedback measurements that satisfy a discrimination threshold condition; and/or
  generating a measurement report containing only those feedback measurements that satisfy a discrimination threshold condition; and/or
  sending the measurement report and/or any of the feedback measurements generated using the discrimination threshold(s) to a network node.

Exemplary feedback measurements include, but are not limited to, RSTD measurements, position measurements, etc. Exemplary discrimination thresholds include, but are not limited to, a time difference threshold, e.g., an RSTD threshold, and a reference signal threshold. A time difference threshold may be, e.g., used to determine when to perform measurements, which measurements to include in the measurement report, and/or which measurements to use to calculate the position of the wireless device. A reference signal threshold may be, e.g., used to select a reference cell. For example, a wireless device may select the cell having a Time of Arrival (TOA) below a TOA threshold as the reference cell. In another example, the wireless device may include those measurements having an absolute value less than a time difference threshold in the measurement report. In any event, the discrimination provided by the solution presented herein reduces and/or eliminates error-prone measurements, and thus, achieves better positioning accuracy.

One exemplary method as implemented by a network node, e.g., a positioning node, an E-SMLC, or an eNodeB, comprises receiving a measurement report from a wireless device, the measurement report including one or more feedback measurements, e.g., timing and/or position measurements, derived by the wireless device using at least one discrimination threshold. The method further includes processing the received measurement(s) to determine a position of the wireless device. To that end, one exemplary network node comprises communication circuitry, a memory, and a processing circuit. The communication circuitry receives the measurement report from the wireless device, where the received measurement report comprises one or more feedback measurements derived by the wireless device using the discrimination threshold(s). The processing circuit processes the measurement(s) in the measurement report to determine a position of the wireless device. For example, the processing circuit may determine the position of the wireless device using RSTD measurements in the measurement report.

The discrimination thresholds may be pre-defined, autonomously obtained by the respective nodes (e.g., adaptively configured for the given environment, based on measurements, etc.), or received from another node (device receives from positioning node or from eNodeB).

There may also be a device capability related to its ability to use at least one of: RSTD_threshold and ref_threshold. The capability may be signaled to another network node or device.

There may also be a network node capability related to its ability to use at least one of: RSTD_threshold and ref_threshold. The capability may be signaled to another network node or device.

Discriminating may mean excluding measurements from a measurement report or a position estimation calculation, or associating some measurements with an indicator in a measurement report.

Examples of a network node include, but are not limited to, a positioning node, an E-SMLC, and an eNodeB. A wireless device as discussed herein can be any type of wireless device capable of communicating with network node or another device over radio signals. Examples of a wireless device include, but are not limited to, a radio communication device, a user device, a target device, device to device (D2D) capable device, machine type device or device capable of machine to machine communication (M2M), a sensor equipped with device, iPAD, tablet, mobile terminals, smart phone, laptop embedded equipped (LEE), laptop mounted equipment (LME), USB dongles, Customer Premises Equipment (CPE) etc.

Figure 9:
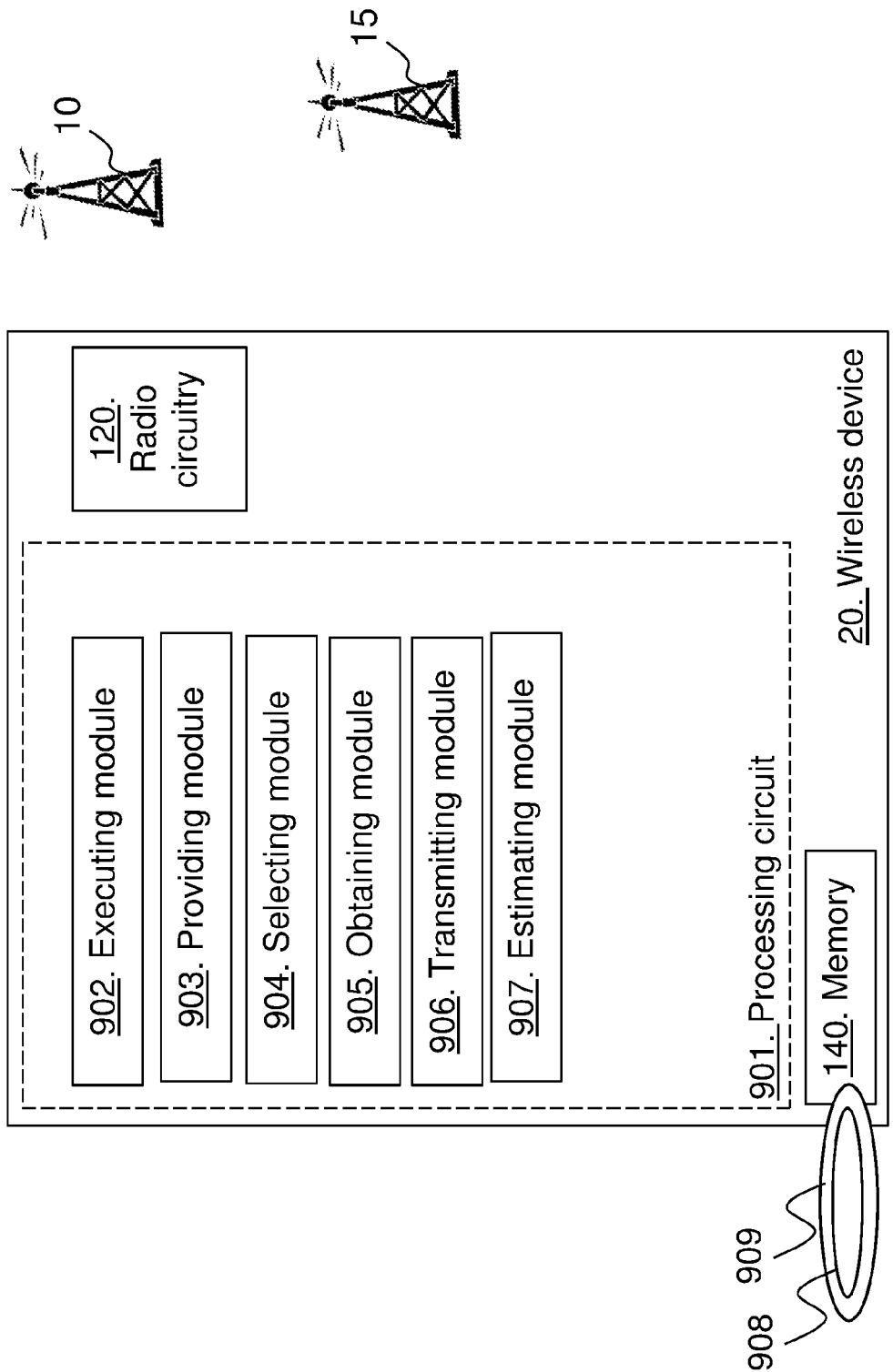
FIG. 9 shows a block diagram of one exemplary wireless device according to the solution presented herein.

The embodiments herein are related to a wireless device to realize the solution in practice as examplified by FIG. 9. FIG. 9 discloses the wireless device 20 for enabling positioning of the wireless device 20 in the wireless network 1.

The wireless device 20 may comprise processing circuitry, exemplified by a processing circuit 901, e.g. one or more processors, configured to perform the methods herein.

The wireless device 20 may comprise an executing module 902. The wireless device 20, the processing circuit 901, and/or the executing module 902 is configured to execute the position process by evaluating one or more variables associated with the execution of the position process based on at least one discrimination threshold. The one or more variables may comprise time differences between times of arrival of signals at the wireless device 20. The one or more variables may comprise one or more measurements for positioning the wireless device 20 and the at least one discrimination threshold may be for discriminating among the one or more measurements for positioning the wireless device 20. The one or more variables may comprise one or more reference signal time difference, RSTD, measurements. The at least one discrimination threshold may comprise the time difference threshold for determining which ones of the one or more feedback measurements to include in the measurement report when providing the one or more feedback measurements to the first network node 10, and/or which ones of the one or more feedback measurements to use when estimating or calculating the position of the wireless device 20. The wireless device 20, the processing circuit 901, and/or the executing module 902 may be configured to evaluate the one or more variables by: discriminating feedback measurements based on the time difference threshold; performing feedback measurements when the feedback measurements are expected to satisfy a discrimination threshold condition based on the time difference threshold; estimating or calculating a position of the wireless device using those feedback measurements that satisfy the discrimination threshold condition based on the time difference threshold; and/or by generating a measurement report containing those feedback measurements that satisfy the discrimination threshold condition based on the time difference threshold. The at least one discrimination threshold may comprise the reference signal threshold used for selecting the reference cell for evaluating the one or more variables.

The wireless device 20 may comprise a providing module 903. The wireless device 20, the processing circuit 901, and/or the providing module 903 is configured to provide one or more feedback measurements to be used for calculating a position of the wireless device responsive to the evaluation. The one or more feedback measurements may comprise one or more selected time differences between times of arrival of signals at the wireless device 20 and/or one or more selected measurements for positioning the wireless device 20. The one or more feedback measurements may comprise one or more selected reference signal time difference, RSTD, measurements. The wireless device 20, the processing circuit 901, and/or the providing module 903 may be configured to provide the measurement report comprising one or more indications indicating which ones of the one or more feedback measurements that are selected based on the at least one discrimination threshold.

The wireless device 20 may comprise a selecting module 904. The one or more variables may comprise at least one feedback measurement and the wireless device 20, the processing circuit 901, and/or the selecting module 904 may be configured to select, using the reference signal threshold, the reference cell as the reference point for performing the at least one feedback measurement.

The wireless device 20 may comprise an obtaining module 905, e.g. a receiver or transceiver. The wireless device 20, the processing circuit 901, and/or the obtaining module 905 may be configured to obtain the at least one discrimination threshold from the first network node 10.

The wireless device 20 may comprise a transmitting module 906, e.g. a transmitter or transceiver. The wireless device 20, the processing circuit 901, and/or the transmitting module 906 may be configured to transmit the capability indication indicating capability for using the at least one discrimination threshold.

The wireless device 20 may comprise an estimating module 907. The wireless device 20, the processing circuit 901, and/or the estimating module 907 may be configured to estimate, or calculate, the position of the wireless device 20 based on the one or more feedback measurements and to take into account in the estimation or calculation whether the one or more feedback measurements are discriminated or non-discriminated.

The apparatus 20 of FIG. 9 describes the wireless device 20, arranged with radio circuitry 120 to communicate with a network node, e.g. first network node 10, in some embodiments via a serving base station, memory 140 to store information related to embodiments presented herein, and processing circuitry such as the processing circuit 901. The processing circuit 901 of the wireless device 20 optionally indicates capabilities to the network node, e.g. first network node 10 via the radio circuitry 120. Moreover, the processing circuit 901 obtains threshold configurations, e.g., via the radio circuitry 120 or from the memory 140. The configured thresholds are used by the processing circuit 901 for discriminating measurements retrieved from the radio circuitry 120 for positioning purposes. After discrimination, the processing circuit 901 uses the measurements after discrimination to provide one or more measurements, e.g., for position estimation of the wireless device 20, or to be included in a measurement report. The measurement report may optionally comprise indicators to indicate that discrimination has been considered, and may also indicate which measurements that are subject to discrimination. One example of the latter is when the discrimination has implied the consideration different quantization resolution for discriminated and non-discriminated measurements.

The methods according to the embodiments described herein for the wireless device 20 are respectively implemented by means of e.g. a computer program 908 or a computer program product, comprising instructions, i.e., software code portions, which, when executed on at least one processor, cause the at least one processor to carry out the actions described herein, as performed by the wireless device 20. The computer program 908 may be stored on a computer-readable storage medium 909, e.g. a disc or similar. The computer-readable storage medium 909, having stored thereon the computer program, may comprise the instructions which, when executed on at least one processor, cause the at least one processor to carry out the actions described herein, as performed by the wireless device 20. In some embodiments, the computer-readable storage medium may be a non-transitory computer-readable storage medium.

Figure 10:
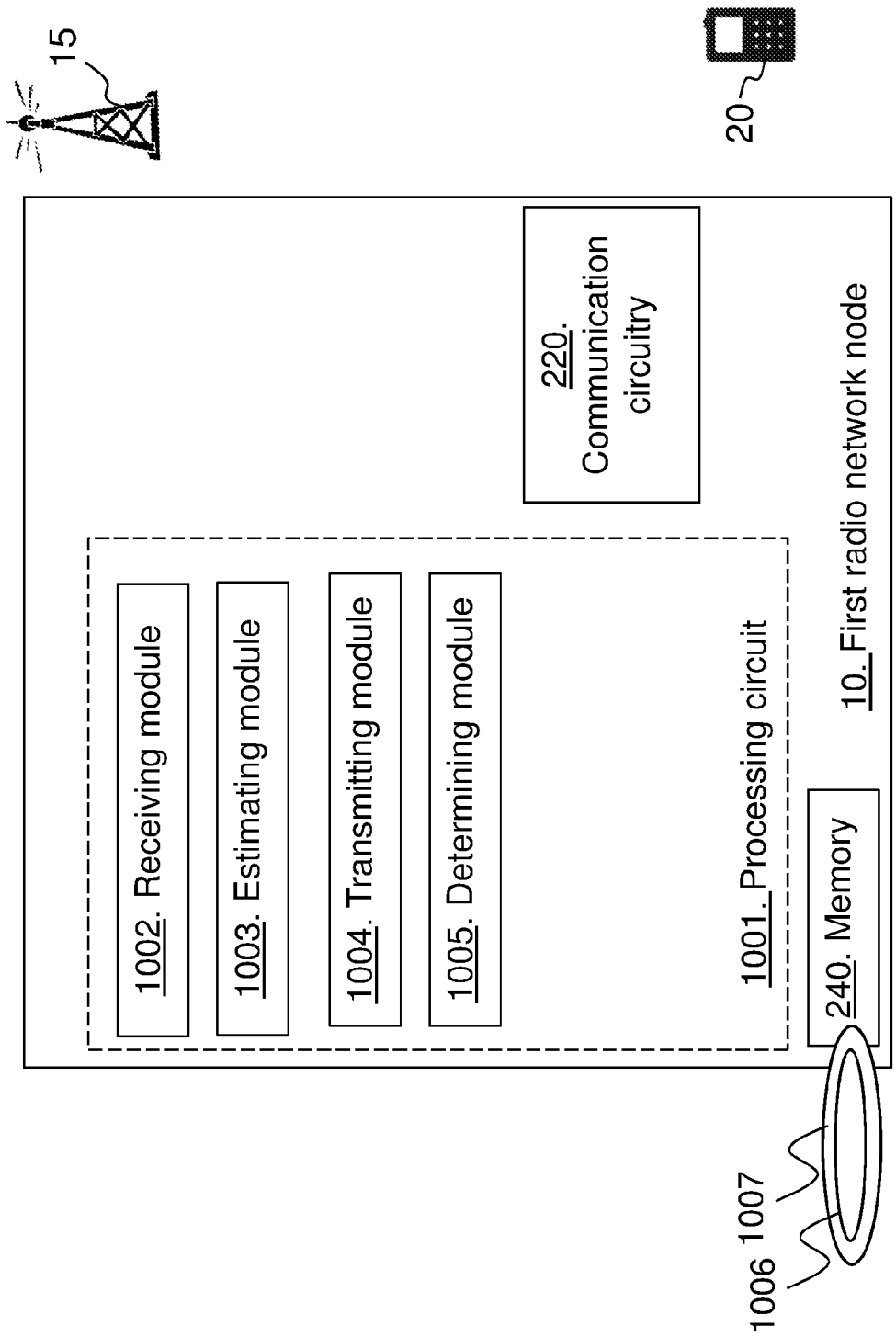
FIG. 10 shows a block diagram of one exemplary first network node according to the solution presented herein.

The embodiments presented herein are related to an apparatus to realize the solution in practice as examplified by FIG. 10. FIG. 10 is a block diagram depicting the first network node, such as a positioning node, an access node similar, for enabling positioning of the wireless device 20 in the wireless network.

The first network node 10 may comprise processing circuitry, exemplified by a processing circuit 1001, e.g. one or more processors configured to perform the methods herein.

The first network node 10 may comprise a receiving module 1002, e.g. a receiver or a transceiver. The first network node 10, the processing circuit 1001, and/or the receiving module 1002 is configured to receive the measurement report from the wireless device 20, which measurement report comprises the one or more feedback measurements associated with the at least one discrimination threshold. The received measurement report may comprise one or more indications indicating which ones of the one or more feedback measurements that are selected based on the at least one discrimination threshold.

The first network node 10 may comprise an estimating module 1003. The first network node 10, the processing circuit 1001, and/or the estimating module 1003 is configured to estimate, or calculate, the position of the wireless device 20 based on the received measurement report and on that the one or more feedback measurements are associated with the at least one discrimination threshold.

The first network node 10 may comprise a transmitting module 1004, e.g. a transmitter or a transceiver. The first network node 10, the processing circuit 1001, and/or the transmitting module 1004 may be configured to transmit the at least one discrimination threshold to the wireless device 20. The at least one discrimination threshold may comprise the time difference threshold for determining which ones of the one or more feedback measurements to include in the measurement report, and/or for determining which ones of the one or more feedback measurements to use when estimating or calculating the position of the wireless device 20 and/or comprise the reference signal threshold to be used for selecting the reference cell for evaluating one or more variables at the wireless device 20.

The first network node 10, the processing circuit 1001, and/or the receiving module 1002 may be configured to receive from the wireless device 20, the capability indication indicating capability for using the at least one discrimination threshold. The first network node 10 may comprise a determining module 1005. The first network node 10, the processing circuit 1001, and/or the determining module 1005 may be configured to determine the at least one discrimination threshold based on the received capability indication.

The first network node 10, the processing circuit 1001, and/or the estimating module 1003 may be configured to estimate, or calculate, the position of the wireless device 20 by being configured to exclude at least one feedback measurement in the received measurement report based on the at least one discrimination threshold. The first network node 10, the processing circuit 1001, and/or the estimating module 1003 may be configured to estimate, or calculate, the position of the wireless device by being configured to weigh at least one feedback measurement relative to another feedback measurement based on the at least one discrimination threshold. The first network node 10, the processing circuit 1001, and/or the estimating module 1003 may be configured to estimate, or calculate, the position of the wireless device based on said one or more indications.

The apparatus 10 of FIG. 10 is exemplified herein as the first network node 10, arranged with communication circuitry 220 to communicate with remote wireless devices, memory 240 to store information related to the solution presented herein, and processing circuitry such as the processing circuit 1001. The communication circuitry 220 may be configured to receive device capabilities of supported report resolutions and support for measurement discrimination, may be configured to send a threshold configuration to the wireless device 20, configured to receive a measurement report from the wireless device 20 that may comprise discriminated measurements. The communication circuitry 220 sends and receives information to/from the processing circuit 1001 and memory 240. The processing circuit 1001 may consider the discrimination information in the obtained measurement reports when estimating the position of the wireless device 20.

The methods according to the embodiments described herein for the first network node 10 are respectively implemented by means of e.g. a computer program 1006 or a computer program product, comprising instructions, i.e., software code portions, which, when executed on at least one processor, cause the at least one processor to carry out the actions described herein, as performed by the first network node 10. The computer program 1006 may be stored on a computer-readable storage medium 1007, e.g. a disc or similar. The computer-readable storage medium 1007, having stored thereon the computer program, may comprise the instructions which, when executed on at least one processor, cause the at least one processor to carry out the actions described herein, as performed by the first network node 10. In some embodiments, the computer-readable storage medium may be a non-transitory computer-readable storage medium.

The advantages of the proposed solution can be summarized as follows. First, by introducing RSTD_threshold and ref_threshold, the solution presented herein makes it possible to filter out RSTDs with an unfavorable mixture of macro and small cells. Further, by discriminating some RSTD measurements, embodiments herein make it possible to improve the positioning accuracy in e.g. mixed cell deployments. In addition, by discriminating measurements at the wireless device 20, the embodiments presented herein make reporting the measurements more efficient by only reporting, at a fine granularity, —a subset of the measurements. Further still, by discriminating measurements, for example while the wireless device 20 is indoors and/or is far away from the closest macro cell or network node of the macro cell, the embodiments presented herein make it more beneficial in terms of positioning estimation to sort out the RSTD measurements with the macro-cells.

The embodiments presented herein provide a method for discriminating among measurements to improve positioning performance in mixed-cell deployments. The method for discriminating among measurements can either be included in the position calculation in case it is done at the positioning node, or the network could control the desired measurements by e.g., signalling some thresholds to the wireless device.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A wireless device for enabling positioning of the wireless device in a wireless network; the wireless device comprising:
   processing circuitry;
   memory containing instructions executable by the processing circuitry whereby the wireless device is operative to:
      execute a position process by evaluating one or more variables associated with the execution of the position process based on at least one discrimination threshold; and
      provide one or more feedback measurements to be used for estimating a position of the wireless device responsive to the evaluation, wherein the at least one discrimination threshold comprises a time difference threshold for determining which ones of the one or more feedback measurements to include in a measurement report when providing the one or more feedback measurements to a first network node, and which ones of the one or more feedback measurements to use when estimating the position of the wireless device,
         wherein the determining of which ones of the one or more feedback measurements to be included in the measurement report is based on discriminating feedback measurements based on the time difference threshold; and
         wherein performing feedback measurements when the feedback measurements are expected to satisfy a discrimination threshold condition based on the time difference threshold,
   wherein the instructions are such that the wireless device is operative to evaluate the one or more variables by:
   estimating a position of the wireless device using those feedback measurements that satisfy the discrimination threshold condition based on the time difference threshold; and
   generating a measurement report containing those feedback measurements that satisfy the discrimination threshold condition based on the time difference threshold.

2. The wireless device of claim 1, wherein the one or more variables comprise time differences between times of arrival of signals at the wireless device.

3. The wireless device of claim 1:
   wherein the one or more variables comprise one or more measurements for positioning the wireless device; and
   wherein the at least one discrimination threshold is for discriminating among the one or more measurements for positioning the wireless device.

4. The wireless device of claim 1, wherein the one or more variables comprise one or more reference signal time difference measurements.

5. The wireless device of claim 1, wherein the one or more feedback measurements comprise one or more selected time differences between times of arrival of signals at the wireless device and/or one or more selected measurements for positioning the wireless device.

6. The wireless device of claim 1, wherein the one or more feedback measurements comprise one or more selected reference signal time difference measurements.

7. The wireless device of claim 1, wherein the at least one discrimination threshold comprises a reference signal threshold used for selecting a reference cell for evaluating the one or more variables.

8. The wireless device of claim 7:
   wherein the one or more variables comprises at least one feedback measurement; and
   wherein the instructions are such that the wireless device is operative to select, using the reference signal threshold, a reference cell as a reference point for performing the at least one feedback measurement.

9. The wireless device of claim 1, wherein the instructions are such that the wireless device is operative to obtain the at least one discrimination threshold from a first network node.

10. The wireless device of claim 1, wherein the instructions are such that the wireless device is operative to transmit a capability indication indicating capability for using the at least one discrimination threshold.

11. The wireless device of claim 1, wherein the instructions are such that the wireless device is operative to provide a measurement report comprising one or more indications indicating which ones of the one or more feedback measurements that are selected based on the at least one discrimination threshold.

12. The wireless device of claim 1, wherein the instructions are such that the wireless device is operative to estimate the position of the wireless device based on the one or more feedback measurements and to take into account, in the estimation, whether the one or more feedback measurements are discriminated or non-discriminated.

* * * * *